United States Patent
Smith et al.

(10) Patent No.: US 10,253,837 B2
(45) Date of Patent: Apr. 9, 2019

(54) SACRIFICIAL ENERGY DISSIPATION MECHANISM

(71) Applicant: Structural Fuse, LLC, Riverside, CA (US)

(72) Inventors: Matthew Douglas Smith, Clinton, MS (US); Kyle Aaron Turner, Encinitas, CA (US)

(73) Assignee: STRUCTURAL FUSE, LLC, Clinton, MS (US)

( * ) Notice: Subject to any disclaimer, the term of this patent is extended or adjusted under 35 U.S.C. 154(b) by 220 days.

(21) Appl. No.: 14/821,166

(22) Filed: Aug. 7, 2015

(65) Prior Publication Data

US 2016/0040739 A1 Feb. 11, 2016

Related U.S. Application Data

(60) Provisional application No. 62/176,887, filed on Aug. 9, 2014.

(51) Int. Cl.
*F16F 7/12* (2006.01)
*E04H 9/02* (2006.01)
*E04G 25/00* (2006.01)

(52) U.S. Cl.
CPC ............ *F16F 7/125* (2013.01); *E04H 9/021* (2013.01); *E04H 9/024* (2013.01); *E04H 9/027* (2013.01)

(58) Field of Classification Search
CPC .. F16F 7/12; F16F 7/125; E04B 1/985; E04G 25/00; E04H 9/021; E04H 9/024; E04H 9/027
See application file for complete search history.

(56) References Cited

U.S. PATENT DOCUMENTS

| | | | | |
|---|---|---|---|---|
| 2,724,463 A * | 11/1955 | Becker | ...................... | A47L 3/04 182/4 |
| 4,057,235 A * | 11/1977 | Halopoff | ............. | E05D 13/1223 267/73 |
| 5,482,258 A * | 1/1996 | Clauson | ................... | F16F 7/00 114/230.2 |
| 5,832,861 A * | 11/1998 | Taylor | .................... | B63B 21/04 114/230.26 |
| 6,805,337 B1 * | 10/2004 | Rastegar | ................ | F16F 1/422 267/136 |
| 8,851,459 B2 * | 10/2014 | Hsu | ........................ | F16F 1/128 267/174 |

(Continued)

FOREIGN PATENT DOCUMENTS

JP 2009197936 A * 9/2009

*Primary Examiner* — Melody M Burch
(74) *Attorney, Agent, or Firm* — Knobbe, Martens, Olson & Bear, LLP (57) ABSTRACT

Structural devices for energy dissipation can be designed to provide asymmetrical responses to cyclic axial loading. The energy dissipation devices can be designed to provide a known or predictable response to tensile loading, along with a different known or predictable response to compressive loading. The devices may include a filament which bears a portion of both tensile and compressive loads and a bracing device which provides lateral support to the filament to prevent buckling. Interlocks or a similar restraining mechanism can be used to resist part of either a compressive or tensile load. These components can be configured in such a manner as to provide an asymmetric response.

15 Claims, 3 Drawing Sheets

(56) References Cited

U.S. PATENT DOCUMENTS

2006/0091593 A1* 5/2006 Costello ............... E05F 1/1075
267/120
2013/0340360 A1* 12/2013 Tsai ........................ E04B 1/98
52/167.1

* cited by examiner

SACRIFICIAL ENERGY DISSIPATION MECHANISM

CROSS-REFERENCE TO RELATED APPLICATIONS

This application claims priority under 35 U.S.C. § 119(e) to U.S. Provisional Application No. 62/176,887, filed Aug. 9, 2014, the disclosure of which is hereby incorporated by reference.

BACKGROUND

1. Technical Field

This disclosure relates to energy dissipation devices which can be used in structural engineering.

2. Description of the Related Art

Often, it is necessary to control the physical response of a mechanical or structural system from some dynamic excitation. This can be done through the use of materials with inelastic behaviors. In buildings, for instance, certain regions of the building may be designed as "structural fuses" that become damaged during a high-intensity seismic event. These "fuses" can be constructed of steel or reinforced concrete and detailed such that they deform in a ductile manner, dissipating energy during a dynamic motion. An example of one of these "fuse" types is the braced frame. There are several well developed, and quite effective, types of structural "fuses" used in structural and mechanical system design. Most have a similar behavior when loaded in either of two possible directions (e.g. tension/compression, positive/negative bending, etc.) This type of behavior is described herein as having a symmetric load-deformation behavior.

Some applications have a need for an asymmetric load-deformation behavior. As an example, a pre-engineered metal building can use steel moment frames to resist lateral building loads in the building transverse direction. Most metal buildings are lightweight, and thus their structural member sizes are controlled by load demands from non-seismic types of loading, such as snow or roof dead load. Research has shown that these types of structures lack the level of ductility often found in traditional column-and-beam steel frames. An attempt at using a traditional steel plastic hinge would place a symmetric behavior hinge near the column-to-rafter joint, but as the bending moments from snow and dead load often exceed those from the expected seismic demands, sizing the plastic hinges for seismic demands would result in failure under those other loadings. Stronger plastic hinges, sized for the controlling load cases, would result in a lack of energy dissipation during seismic excitation. Therefore, this application would benefit from an energy dissipation device that would provide sufficient strength and stiffness to resist non-seismic loads, while still deforming significantly under seismic demands, such as an energy dissipation device with an asymmetric load-deformation behavior.

The concentric braced frame is an example of an energy dissipation system that has an asymmetric load-deformation behavior. It is designed to yield in tension. However, it buckles in compression. Due to the high local strains caused by buckling, cyclic loading of the concentric braced frame tends to result in low-cycle fatigue cracking. Also, the post-buckling strength and stiffness of the brace is difficult to predict and typically a source of high uncertainty in design.

Another type of lateral load resisting system formed from asymmetrically behaving components is the tension-only brace. This type of brace, made from slender rods or cables, has effectively no compression strength, and therefore must be used in pairs (e.g. an X-configuration) to provide bi-directional strength and stiffness. The tension-only braces do not typically provide energy dissipation, only linear elastic strength and stiffness to resist lateral forces on the buildings. If they were to yield, the rods/cables would elongate and effectively result in an unsupported structure when the building returned to its original configuration. Neither of these types of devices provides a reliable and ductile asymmetric load-deformation behavior.

SUMMARY

In one embodiment, an energy dissipation device can include a first retaining member, the first retaining member defining a first receiving space, a second retaining member, the second retaining member defining a second receiving space, a filament extending along a longitudinal axis through the first and second receiving spaces, the filament secured at a first end to the first retaining member and secured at a second end to the second retaining member, at least one of the first and second retaining members being configured to constrain longitudinal translation of the first and second retaining members relative to one another to provide an asymmetric force-displacement response to an induced axial load.

In one aspect, the second retaining member can be configured to at least partially extend into the first receiving space of the first retaining member, and at least one of the first and second retaining members can include a stop configured to inhibit removal of the second retaining member from the first receiving space of the first retaining member.

In one aspect, the first receiving space of the first retaining member can include a deformation region in which the cross-sectional size of the first receiving space allows for the lateral translation of the second retaining member from the second receiving space into the first receiving space when a compressive axial load is applied to the device.

In one aspect, a first end of the first retaining member can be configured to abut a first end of the second retaining member to inhibit further longitudinal translation of the first and second retaining members either towards or away from one another, depending on the desired geometric configuration.

In one aspect, the first retaining member can include a first set of parallel plates and the second retaining member can include a second set of parallel plates, and the second retaining member can be configured to at least partially extend into the first receiving space of the first retaining member. In a further aspect, the filament and each of the plates in the first and second sets of parallel plates can an aperture extending therethrough, and the longitudinal dimensions of the apertures in the first set of parallel plates can be larger than the longitudinal dimensions of the apertures in the second set of parallel plates.

In one aspect, the device can additionally include a first end-cap secured to the first retaining member and the first end of the filament, and a second end-cap secured to the second retaining member and the second end of the filament.

In another embodiment, an energy dissipation device configured to provide an asymmetric response to axial loading can include an axial member extending in a longi-tudinal direction between a first endcap and a second endcap, a bracing mechanism enclosing at least a portion of the axial member, the at least one bracing member providing lateral support to the axial member to inhibit buckling when the axial member is under a compressive load, a restraining mechanism configured to engage another component of the device to limit longitudinal translation of the first and second endcaps relative to one another, such that other components of the device bear a portion of the axial load when the restraining member is engaged with another component of the device.

In one aspect, the bracing mechanism can include first and second retaining members, where the first endcap includes or is coupled to the first retaining member and the second endcap includes or is coupled to the second retaining member, where the first retaining member encloses a portion of the axial member adjacent the first endcap, and where the second retaining member encloses a portion of the axial member adjacent the second endcap. In a further aspect, at least one of the first and second retaining mechanisms can include a contact surface which serves as the restraining mechanism and is configured to engage a portion of the other of the first and second retaining mechanisms to limit lateral translation of the first and second retaining mechanisms and allow the first and second retaining mechanisms to bear a portion of an axial load applied to the device. In one still further aspect, the contact surface can include a surface of the first retaining member facing the second endcap and configured to abut a facing surface of the second retaining member to allow the first and second retaining mechanisms to bear a portion of a compressive axial load applied to the device. In another still further aspect, the contact surface can include a surface of the first retaining member facing the first endcap and configured to engage an interlocking surface of the second retaining member to allow the first and second retaining mechanisms to bear a portion of a tensile axial load applied to the device.

In one aspect, the restraining mechanism can be independent of the bracing mechanism. In a further aspect, the restraining mechanism can include a second axial member extending through an aperture in one of the first or second endcaps, and at least one stop coupled to the second axial member, where the apertures in one of the first or second endcaps is located between the of stop and the other of the first or second endcaps, and where a cross-sectional dimension of the stop is larger than a cross-sectional dimension of the apertures such that the stop abuts an outer surface of the endcap including the apeture to limit longitudinal translation of the endcaps away from one another.

In another embodiment, a structural and/or mechanical energy dissipation device can include a first end-cap, a second end-cap, a filament extending between the first end-cap and the second end-cap, the filament including a material having nonlinear mechanical properties, a filament bracing component, and a restraining component including at least one contact surface configured to contact another portion of the device to limit further translation of the first end-cap relative to the second end-cap to provide an asymmetric force-displacement response to an induced axial load.

In one aspect, the first end cap can be rigidly attached to the restraining component and the second end cap can be movable over a limited range with respect to the restraining component. In one aspect, a first cross-sectional dimension of the filament can be at least twice as large as a second cross-sectional dimension of the filament. In one aspect, filament bracing component includes at least two cantilevered members rigidly attached to the first end-cap, where a length of the at least two cantilevered members is less than a length of the filament but at least half the length of the filament. In one further aspect, the device can additionally include at least two cantilevered members rigidly attached to the second end-cap, where the at least two cantilevered members, and where the at least two cantilevered members rigidly attached to the first end-cap and the at least two cantilevered members rigidly attached to the second end-cap are configured to be freely translatable past one another when an axial load is applied to the device. In another further aspect, the filament can include at least one of a metal, a shape memory alloy, or a composite material.

DETAILED DESCRIPTION

Embodiments of energy dissipation devices described herein provide an asymmetric load-deformation behavior, through the use of several components, which can be configured to provide a larger strength and stiffness in either tension or compression. In addition, buckling is prevented through continuous bracing of the deformable element. Finally, both configurations of the device can allow the tension and compression strength and stiffness to be purposefully designed with a high degree of certainty for both tension and compression.

Embodiments of energy dissipation devices which exhibit the intended asymmetric strength and stiffness described herein can be constructed in many possible configurations. Two exemplary configurations are described herein to demonstrate the concept. Both of these example configurations include a combination of certain elements: a filament or similar deformable element, interlocks which provide strength and stiffness, filament bracing components, and end-caps or similar connective elements. The filament is the deformable portion of the device, undergoing inelastic deformations to dissipate energy. The interlocks, configured in various ways, contribute to either the tensile or compressive strength and stiffness, dependent upon the particular configuration. The filament bracing components provide lateral bracing to the filament to prevent buckling, which would cause low-cycle fatigue. The end-caps connect all the components together and provide attachment points to the mechanical or structural system of application. It will be understood that the elements described in the two example configurations are merely exemplary, and that other embodiments may include additional or fewer elements. For example, elements other than end-caps may be used to attach the energy dissipation device to surrounding structural or mechanical components. As another example, the function of the interlocks may, instead, be performed by other mechanisms, including bolts, cables, rods, plates, or other feasible methods.

In reference to the aforementioned metal building application this device could be attached in place of a beam-to-column knee joint web plate, in a diagonal truss configuration. The parts and pieces could be configured to provide a high strength and stiffness when under snow or roof dead load and a weaker strength when the loads are reversed due to a seismic event. This is only one of many potential applications of the embodiments described herein.

Figure 1:
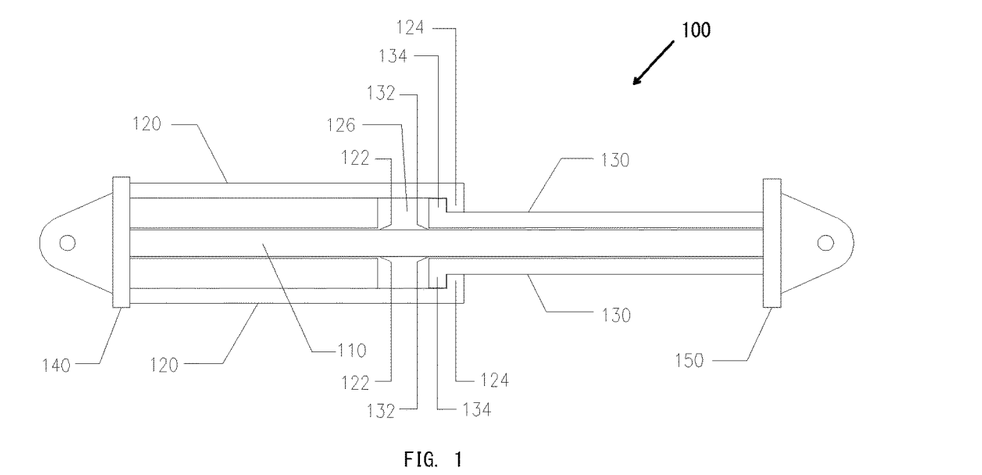
FIG. 1 illustrates a cross-sectional view of one embodiment of an energy dissipation device which is configured to be stronger and stiffer in tension than in compression.

FIG. 1 illustrates a cross-sectional view of an energy dissipation device which is configured to be stronger and stiffer in tension than in compression. This energy dissipation device 100 includes a filament 110 extending through the receiving spaces 122 and 132 defined by the positions of the outer interlocks 120 and inner interlocks 130. Within receiving space 122 exists a deformation chamber 126 which defines the space whereupon inner interlocks 130 translate into receiving space 122.

The filament 110 may include a rod formed from an inelastically deformable material. In some embodiments, this material may be metallic. The filament 110 extends between two end-caps 140 and 150. In some embodiments, the filament 110 can be positively attached to the end-caps 140 and 150, such as through the use of weldament, although other connection types and methods can be used.

The cross-section (in a plane normal to the longitudinal axis of the filament 110) of the filament 110 can be of any suitable geometry, having dimensions appropriate to satisfy the particular design requirements for a given instance of application. The cross-section of the filament 110 may vary along its length. In some embodiments, the filament may have a circular cross-section, a square cross-section, or a rectangular cross-section, although any other suitable shapes and dimensions may be used. In some embodiments, the filament may be a plate, having a first cross-sectional dimension (e.g., width) that can be substantially larger than the second cross-sectional dimension (e.g., height). For example, in some implementations the first cross-sectional dimension may at least be 2, 3, 5, or 10 times as large as the second cross-sectional dimension, although any suitable ratio may be used. When the first cross-sectional dimension is sufficiently larger than the second-cross-sectional dimension, bracing to prevent buckling of the filament 110 may be provided primarily or exclusively on either side of the shorter dimension of the filament 110, as the increased thickness of the longer dimension will provide resistance to buckling.

In some embodiments, the geometry and material of the filament 110 are chosen such that filament 110 will provide a sustained integrity of strength and stiffness, through multiple cycles of large compressive and tensile deformations, as required by the particular application, so as to prevent low-cycle fatigue cracking and rupture of the filament 110, such that a desired response can be designed into the particular embodiment with a high degree of reliability. In some embodiments, the filament 110 may be formed from or may include a material which has nonlinear mechanical properties. In some specific embodiments, the filament 110 may be formed from a metal such as steel, or from a shape memory alloy, or from a composite material such as a carbon fiber material, although a wide range of alternative materials may also be used, depending on the particular embodiment.

Figure 6:
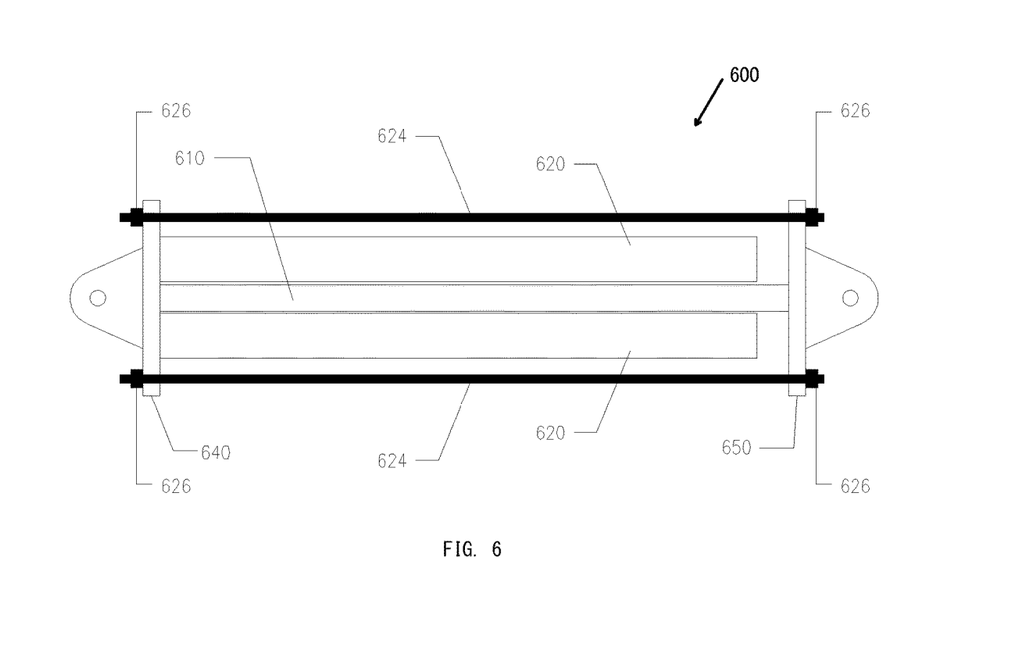
FIG. 6 illustrates another embodiment of an energy dissipation device which provides similar performance to that of the embodiment illustrated in FIG. 1, using interlocks which do not provide lateral restraint to the filament, instead using additional components to provide the lateral restraint to the filament.

The outer interlocks 120 and inner interlocks 130 are a set of longitudinally-extending and interlocking elements which, in conjunction with the location of filament 110, define interior receiving spaces 122 and 132, respectively, and border the filament 110 along its length and are positively attached to end-caps 140 and 150. Only the outer interlocks 120 or inner interlocks 130 are attached to each end-cap, typically by weldment, with the outer interlocks 120 being attached to the end-cap 140 and the inner interlocks 130 being attached to the end-cap 150. In some embodiments, there may exist multiple pairs of inner and outer interlocks 120 and 130 or multiple tensile members such as rods surrounding the filament 110, as illustrated in FIG. 6.

Some or all of the outer interlocks 120 and inner interlocks 130 can include a structural feature configured to constrain longitudinal translation of the outer interlocks 120 relative to the inner interlocks 130. This structural feature may include a geometrical means of interlocking, in various embodiments, such as a pair of flanges, a slot and stud pair, nuts on the ends of threaded rods extended through the end-caps 140 or 150 or any other suitable structural feature. In some embodiments, the structural feature may include a contact surface configured to engage, interlock with, abut, or otherwise come into contact with another component of the device. In the embodiment illustrated in FIG. 1, the outer interlocks 120 include an inwardly extending flange 124 and the inner interlocks 130 include an outwardly extending flange 134. In this embodiment, the flanges 124 and 134 do not prevent longitudinal translation of the interlocks 120 and 130 towards one another in such a manner as to cause the mutual separation of flanges 124 and 134, but instead constrain longitudinal translation of the interlocks 120 and 130 away from one another in such a manner as to cause the mutual contact of flanges 124 and 134, thereby placing the interlocks 120 and 130 into tension.

The function of the filament bracing components in the basic device configuration illustrated in FIG. 1 is performed by the interlocks 120 and 130. The interlocks 120 and 130 are separate from, but may be in contact with, the filament 110 along its length to provide lateral restraint to the filament 110 whilst the filament 110 is in compression. The cross-sections (in a plane normal to the longitudinal axis of the device) of the interlocks 120 and 130 and of the interior receiving spaces 122 and 132 can be of any suitable geometry, having dimensions appropriate to satisfy the particular design requirements for a given instance of application and to provide any necessary lateral restraint to the filament 110 along its length. The interlocks 120 and 130 can be formed from any material appropriate to satisfy the particular design requirements for a given instance of application. In some embodiments, the interlocks 120 and 130 may be metallic, however it is conceivable that other materials, such as plastics, composites, ceramics, woods, or other material types, may be utilized in design and fabrication of the interlocks 120 and 130. As noted above, the structural features that provide points of contact between the interlocks 120 and 130, which provide unique behavioral characteristics of the device 100, may take on many various forms which may depend on the particular design requirements for a given instance of application, most notably, the selected basic device configuration illustrated in FIG. 1.

The end-caps 140 and 150 are connector pieces which can serve two purposes: to provide attachment points to the dynamical system to which the device 100 is to be attached, and to provide a base of attachment at each end of the device 100 such that the interlocks 120 and 130 and the filament 110, together, form an interconnected system. The end-caps 140 and 150 can be of any suitable geometry and material, having properties to satisfy the particular design requirements for a given instance of application. In some embodiments, each pair of end-caps 140 and 150 can be identically constructed, while in other embodiments the end-caps may be differently constructed. In some embodiments, some form of flexural moment release (such as a pin-type hinge or a universal joint) will be included in the geometry of each end-cap 140 and 150 such that the device acts to primarily resist axial deformations.

Figure 3:
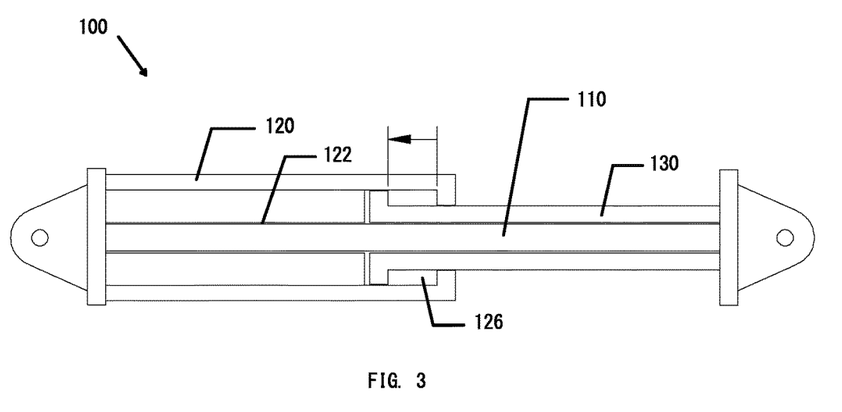
FIG. 3 illustrates the operation of the energy dissipation device embodiment illustrated in FIG. 1 under compression, in which the inner interlocks recess into a deformation chamber located within the spaces defined by the position of the outer interlocks

Thus, the device 100 of FIG. 1 is stronger and stiffer in tension than in compression. The interlocks 120 and 130 are configured such that they will freely longitudinally translate along one another's longitudinal axis, as shown in FIG. 3, when the device 100 is compressed. Thus, the only longitudinal element undergoing compressive stress, in this particular embodiment, is the filament 110.

Figure 4:
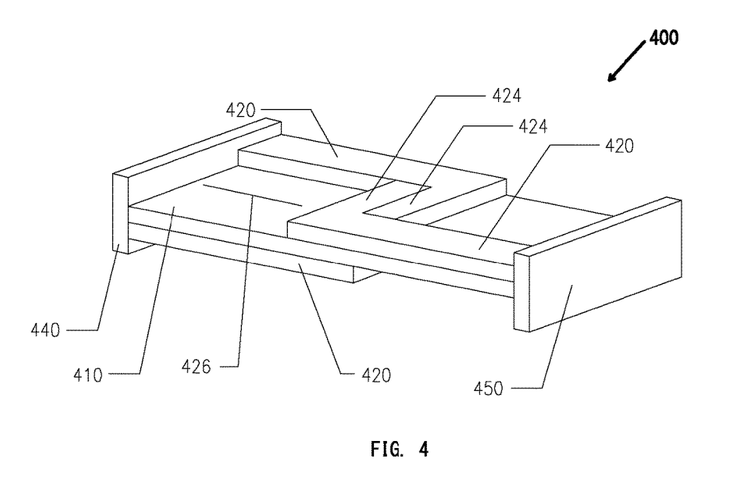
FIG. 4 illustrates another embodiment of an energy dissipation device with an alternative interlock design to provide a similar performance to that of the embodiment illustrated in FIG. 1, using a left and right interlock instead of an inner or outer interlock

The deformation chamber 126 is a void between the outer interlocks 120 and the filament 110 that allows the inner interlocks 130 to recess into receiving space 122 unimpeded by the presence of outer interlocks 120. The deformation chamber 126 can have a longitudinal dimension appropriate to allow the expected maximum compressive deformation of the filament 110. This dimension will be determined as appropriate to meet the particular design requirements for a given instance of application. In some embodiments, the length of the deformation chamber 126 can be designed such that it is as short as feasible so as to provide the maximum length of lateral restraint for the filament 110, although in other embodiments longer deformation chambers 126 may be used Note that the interlocks 120 and 130 may be constructed from multiple parts that convolute the distinction between the "outer" and "inner" descriptors. One possible example of this convolution is depicted in FIG. 4. FIG. 4 illustrates an alternate embodiment of an energy dissipation device. The energy dissipation device 400 includes a filament 410, end-caps 440 and 450, and symmetrical interlocks 420. The filament 410 in the illustrated embodiment is a planar structure having a longitudinal axis extending between caps 440 and 450. The interlocks 420 are two pairs of L-shaped structures having flanges 424 extending perpendicular to the longitudinal axis of the filament 410. The flanges 424 of one interlock interact with one another when the structure is in tension to prevent longitudinal translation of the interlocks 420 away from one another. Additional alternative embodiments of the interlocks are possible.

Figure 5:
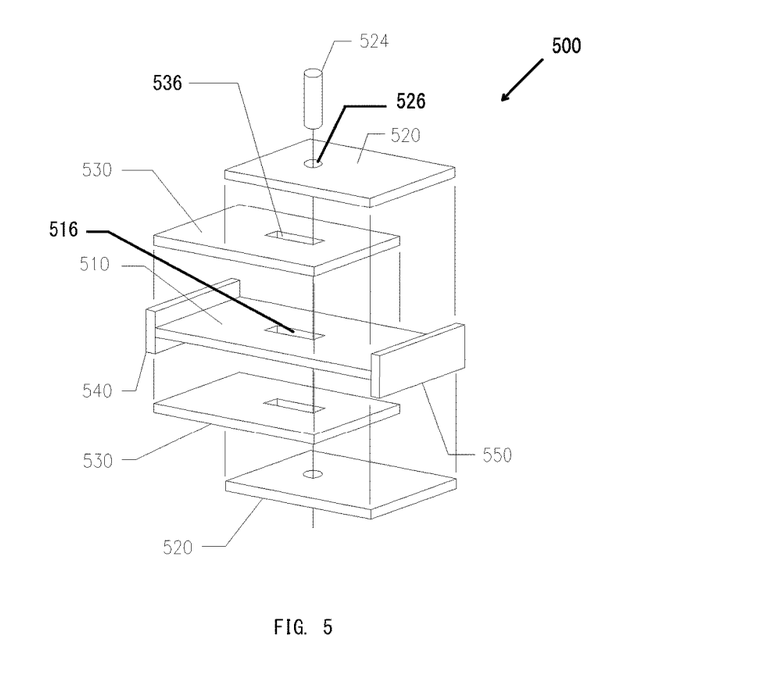
FIG. 5 illustrates another embodiment of an energy dissipation device which provides similar performance to that of the embodiment illustrated in FIG. 1, using a bolt and slotted holes instead of flanged interlocks.

FIG. 5 illustrates another embodiment of an energy dissipation device which uses a bolt and slotted holes instead of flanged interlocks. The filament 510 is a planar structure having a longitudinal axis extending between caps 540 and 550. Unlike the planar filament 410 of FIG. 4, however, the filament 510 includes a longitudinally extending slot 516 extending therethrough. The longitudinally extending slot 516 may in some embodiments be centered and aligned with the longitudinal axis of the filament 510. The inner interlock 530 is a pair of parallel plates defining a receiving space for the filament 510, each of which includes a longitudinally extending slot 536 which can be aligned with the longitudinally extending slot 516 in filament 510. The outer interlock 520 includes a pair of parallel plates defining a receiving space for the inner interlock 530, each of which includes a hole 526 which is longitudinally shorter than the longitudinally extending slots 536 and 516. When a member such as a bolt, rod, pin or stud 524 is inserted through the hole 526 and slots 516 and 536, the stud 524 will constrain movement of the outer interlock 520 relative to the inner interlock 530, with the difference in longitudinal length between the hole 526 and the slots 516 and 536 permitting some longitudinal translation.

Each of the configurations illustrated and described herein include filament bracing components designed to provide adequate lateral restraint to the filament to prevent said filament from buckling in compression. This function may be performed by the interlocks 120, 130, 420, 520, or 530, or by separate alternative components such as FIG. 6's filament bracing components 620, discussed in greater detail below The quantified adequate lateral restraint can be determined via structural mechanics and can consist of both strength and stiffness requirements.

The interlocks 120, 130, and 420, 520, or 530, depicted in and described with respect to the devices 100, 400, and 500 include a mechanism to provide contact between the interlock pairs when the device is placed into tension. This contact mechanism can take the form of a pair of flanges 124, 134, and 424, a slot 526 and stud 524 pair as depicted in FIG. 5's illustration of energy dissipation device embodiment 500.

FIG. 6 illustrates another embodiment of an energy dissipation device using interlocks which do not provide lateral restraint to the filament, instead using additional components to provide the lateral restraint to the filament. In particular, the energy dissipating device 600 includes a filament 610 extending between end-caps 640 and 640. At least one end-cap 640 includes filament bracing components 620 surrounding the filament 610 to provide lateral restraint to the filament 610 when the device 600 is in compression. In addition to the filament bracing components 620, the device 600 includes rods 624 which include nuts 626 or other stops located outward of the end caps 640 and 650. The nuts 626 constrain translation of the end caps 640 and 650 away from one another, without constraining translation of the end caps 640 and 650 towards one another. These rods 624 allow the rods to add to the strength and stiffness of the device 600 when the device 600 is in tension, but will not affect the strength and stiffness of the device 600 when the device is in compression. In other implementations, the rods 624 may be rigidly attached to one of end caps 640 or 650, and extend through an aperture in the other end cap. In such an embodiment, only a single nut 626 per rod 624 on the outside of the unattached end cap would be required to constrain translation.

These contact mechanisms, whether a part of the interlocks, or whether a part of a separate structure which does not provide lateral restraint to the filament, may be constructed of any mechanical means suitable for the particular design requirements of an instance of application. When the contact mechanisms are a part of the interlocks, the contact mechanisms serve to bring the interlocks into contact when the device 100, 400, 500 or 600 is put into tension. This contact will cause the interlocks, in addition to the filament 110, 410, 510, or 610, to resist tensile deformations, adding both strength and stiffness to the device. When in compression, the contact mechanism will separate into the deformation chamber 126, 426, or 526, or the rods 624 will extend through the end-caps 140 and 150 leaving only the filament 110, 410, 510, or 610 to resist compressive deformations.

In embodiments such as those illustrate as devices 100, 400, 500, or 600, whereupon the device maintains a higher strength and stiffness when in tension than in compression, the device can behave as follows: In the initial, undeformed condition, the interlocks can be of a length such that the contact mechanism is essentially in a relatively stress-free state of contact. If the device is placed into tension, both the filament and the interlocks can contribute to the stiffness that resists the tensile deformation. If, instead, the device is placed into compression, the contact mechanism can separate, and the interlocks will be unable to resist compressive forces. The separation of the contact mechanism can leave only the filament stiffness to resist compressive forces. The mechanical behavior of the device being different in tension than in compression is the source of the asymmetric behavior with respect to the force-displacement response.

If compressive deformation demand imposed on this implementation of the device by the surrounding dynamical system exceeds certain limitations, the filament will experience permanent, inelastic deformation (e.g. yielding), thereby reducing the stiffness of the device, reducing the strength and stiffness of the system, and changing the dynamical properties of the system. This reduction in strength upon reaching a certain limit state provides a "fuse-like" effect to the dynamical system. The device, when functioning as a fuse, can protect the surrounding dynamical system from being overstressed by internal forces generated from responses to external loading. This is a similar concept to that of a plastic hinge at the ends of a concrete or steel frame beam.

The initial strength and stiffness behavior has been described for this implementation. The following is a description of its behavior during cyclic loading: The compression of the filament is expected to experience inelastic strains upon reaching a certain deformation limit. The combined tensile strength and stiffness of the filament and interlocks may be designed to experience inelastic strains at a higher demand than the filament alone, perhaps not experiencing inelastic strain at all during cyclic demand. After a significant compression cycle, upon load reversal, the filament will unload elastically along an unloading stress-strain relationship particular to the filament material. Prior to reaching the original undeformed device length, the filament will be placed into tension. Depending on the magnitude of the previous compressive inelastic strain, the filament may accumulate tensile inelastic strain, or it may still be deforming elastically, when the contact mechanism connects. Further tensioning of the device will then engage both the filament and the interlocks, increasing both the strength and stiffness of this particular embodiment of the device. The cyclic inelastic straining of the filament provides hysteretic energy dissipation for the surrounding dynamical system. This energy dissipation will provide damping for the dynamical system, reducing dynamic response to system excitations.

This device may have numerous applications for systems that require a fuse or energy dissipation but that also have requirements for one displacement direction to be stronger than the other. As an example, low-rise pre-engineered metal building moment frames are designed to resist both vertical and lateral building loads. The rafter-to-column joints have negative (closure-of-joint) bending moment demands due to snow loads, dead loads, and roof live loads. A lateral load, such as a seismic excitation, can cause both negative and positive (opening-of-joint) bending moment demands on the same joints. For lightweight structures, the vertical load demands can be larger in magnitude than the seismic load demands. Therefore, if a typical structural fuse with symmetric behavior were utilized to dissipate energy during a seismic event, one of two situations would occur. One, the symmetric fuse could be a fuse that provides a strength limitation during a seismic event. However, because the fuse must be weaker than the seismic demands, it would also be weaker than the vertical load demands, taking damage from more loads than intended. Two, if the symmetric fuse were strong enough to resist vertical load effects, it could be too strong to deform and dissipate energy during a seismic event, nullifying its purpose.

If placed in the rafter-to-column joint, diagonally between the outer flanges, in place of a standard web plate, a device embodiment which possesses greater strength and stiffness when in tension than in compression would create a truss to transfer bending moments from the rafter to the column. The asymmetric device described would provide a larger strength and stiffness for moments due to vertical load effects, but under a seismic excitation, the device would dissipate energy when placed into compression by a positive bending moment.

Figure 2:
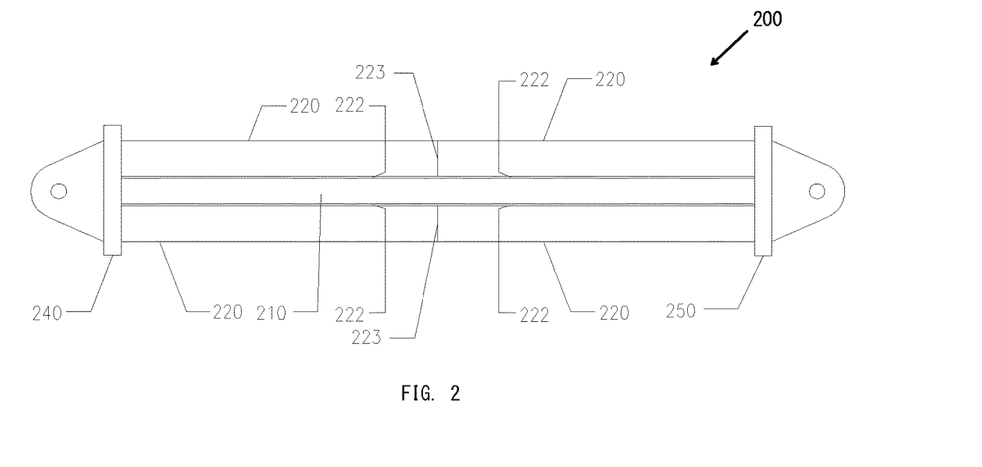
FIG. 2 illustrates a cross-sectional view of an energy dissipation device which is configured to be stronger and stiffer in compression than in tension.

FIG. 2 illustrates a cross-sectional view of an energy dissipation device which is configured to be stronger and stiffer in compression than in tension. This device embodiment 200 includes a filament 210 extending through the receiving space 222 defined by the positions of interlocks 220. The interlocks 220 are configured such that they cannot overlap each other when the device is compressed. The facing end surfaces 223 of the interlocks 220 thus serve as contact surfaces which, when engaged with one another, constrain further lateral translation of the end-caps 240 and 250 towards one another. The filament 210 and interlocks 220 are connected at each end of the device to the end-caps 240 and 250 in a similar fashion as configuration 100.

The interlocks 220 will provide a continuous lateral restraint along the longitudinal axis of the filament 210, except when the device 200 has been tensioned and the interlocks 220 have separated. Note that the interlocks 220 may be constructed from multiple parts.

The interlock configurations may be designed to provide adequate lateral restraint to the filament to prevent said filament from buckling in compression. The quantified adequate lateral restraint is to be determined via structural mechanics and will consist of both strength and stiffness requirements.

The interlocks 220 have a contact mechanism to provide contact when the device 200 is placed into compression. In some embodiments, the contact mechanism may take the form of a pair of contact surfaces 223 as depicted in FIG. 2, but may be constructed of any mechanical means suitable for the particular design requirements of an instance of application. The purpose of this contact mechanism is to bring the interlocks 220 into contact during compression of the device 200. This contact will cause the interlocks 220 to resist compressive deformations, in addition to the filament 210, adding both strength and stiffness to the device. When in tension, the contact surfaces 223 will separate, leaving only the filament 210 to resist tensile deformations.

In this implementation, the device 200 will behave as follows: In the initial undeformed condition, the interlocks 220 will be of a length such that the contact mechanism is in a relatively stress-free state of contact. If the device 200 is placed into compression, both the filament 210 and the interlocks 220 will contribute to the stiffness that resists the compressive deformation. If, instead, the device 200 is placed into tension, the contact surfaces 223 will separate and the interlocks 220 will translate longitudinally away from one another. The separation of the contact surfaces 223 will leave only the filament 210 stiffness to resist tensile deformations. The mechanical behavior of the device 200 being different in tension than in compression is the source of the asymmetric behavior with respect to the force-displacement response.

If tensile deformation demand imposed on this implementation of the device by the surrounding dynamical system exceeds certain limitations, the filament 210 will experience permanent, inelastic deformation (e.g. yielding), thereby reducing the stiffness of the device 200, reducing the strength and stiffness of the system, and changing the dynamical properties of the system. The utility and the effects of this behavior are similar to those of devices 100, 400, 500 and 600, described previously.

The initial strength and stiffness behavior has been described. The following is a description of the behavior during cyclic loading: The combined filament 210 and interlocks 220 compressive strength may be designed such that inelastic strains are not experienced. However, the tension of the filament 210 is expected to experience inelastic strains upon reaching a certain deformation limit. After a significant tension cycle, upon load reversal, the filament 210 will unload elastically along an unloading stress-strain relationship particular to the filament 210 material. Prior to reaching the original undeformed device length, the filament 210 will be placed into compression. Depending on the magnitude of the previous tensile inelastic strain, the filament 210 may accumulate compressive inelastic strain or it may still be deforming elastically when the contact mechanism connects. Further compression of the device 200 will engage both the filament 210 and the interlocks 220, increasing both the strength and stiffness of the device 200. The cyclic inelastic straining of the filament 210 provides hysteretic energy dissipation for the surrounding dynamical system. This energy dissipation will provide damping for the dynamical system, reducing dynamic response to system excitations.

This device 200 may have numerous applications for systems which require a fuse or energy dissipation but also have requirements for one displacement direction to be stronger than the other. Using the same example as for the embodiments described previously, low-rise pre-engineered metal building moment frames are designed to resist both vertical and lateral building loads. If the asymmetric device 200 is placed in the rafter-to-column joint, diagonally between the outer and inner corners of the panel zone, in place of the standard web plate, the device 200 would create a truss to transfer bending moments from the rafter to the column. The device 200 would provide a larger strength and stiffness for moments due to vertical load effects, but under a seismic excitation, it would dissipate energy when placed into tension by a positive bending moment.

The embodiments described above differ from other structural fuse mechanisms because they exhibit predictable and controlled asymmetric strength and stiffness behavior in the load-deformation relationships. Some mechanisms in particular, which may resemble this device, are discussed next in order to convey the differences between those mechanisms and this device.

This device initially appears similar to a buckling restrained brace (BRB). The BRB consists of a similar filament surrounded by a shell. However, the shell is designed to simply provide continuous lateral buckling restraint for the filament and does not resist structural forces as do the interlocks. In addition, the BRB exhibits symmetric strength and stiffness behavior with identical load-deformation responses in both tension and compression.

Device 100 and 200 embodiments could possibly resemble a shock absorber or viscous damper in appearance. Since a shock absorber is also an energy dissipation device, confusion between the utility of these devices could occur. However, a shock absorber works to dissipate energy by providing a resistance proportional to an imposed velocity and relies on pneumatic or hydraulic mechanisms for its functionality.

Finally, the brace of a concentric braced frame, used for resisting lateral loads in building systems, provides an asymmetric load-deformation behavior. It does this by buckling in compression and yielding along its longitudinal axis in tension. However, research has shown that this buckling can cause high local bending strains leading to significant low-cycle fatigue. The compressive strength and stiffness of the concentric brace does not remain constant throughout deformation due to buckling, nor can it be predicted accurately, and therefore cannot be relied upon to resist forces. Embodiments of energy dissipation devices disclosed herein, in contrast, can have tensile and compressive strength and stiffness which is purposefully designed with high accuracy to meet the force and deformation demands of the surrounding structural system and will remain constant throughout excitation. Further, the embodiments described herein will be prevented from buckling by the filament bracing components and will not exhibit the large local bending strains which are problematic to the concentric braced frame system.

Although the invention has been described with reference to the above examples, it will be understood that modifications and variations are encompassed within the spirit and scope of the invention. Accordingly, the invention is limited only by the following claims.

What is claimed is:

1. An energy dissipation device configured to provide an asymmetric response to cyclic axial loading, the device including:
   an axial member extending in a longitudinal direction between a first endcap and a second endcap, the axial member having nonlinear inelastic mechanical properties and configured to compress and elongate under axial loading to alter the distance between the first endcap and the second endcap;
   a bracing mechanism enclosing at least a portion of the axial member, the bracing mechanism providing lateral support to the axial member to inhibit buckling when the axial member is under a compressive load;
   a restraining mechanism configured to engage another component of the device to limit longitudinal translation of the first and second endcaps relative to one another, such that other components of the device bear a portion of the axial load when the restraining mechanism is engaged with the other component of the device, providing an asymmetric force-displacement response to cyclic axial loading, the asymmetric force-displacement response including a nonlinear inelastic force-displacement response.

2. The device of claim 1, wherein the bracing mechanism comprises first and second retaining mechanisms, wherein the first endcap comprises or is coupled to the first retaining mechanism and the second endcap comprises or is coupled to the second retaining mechanism, wherein the first retaining mechanism encloses a portion of the axial member adjacent the first endcap.

3. The device of claim 2, wherein at least one of the first and second retaining mechanisms includes a contact surface, the contact surface configured to engage a portion of the other of the first and second retaining mechanisms to limit lateral translation of the first and second retaining mechanisms and allow the first and second retaining mechanisms to bear a portion of an axial load applied to the device.

4. The device of claim 3, wherein the contact surface comprises a surface of the first retaining mechanism facing the second endcap and configured to abut a facing surface of the second retaining mechanism to allow the first and second retaining mechanisms to bear a portion of a compressive axial load applied to the device.

5. The device of claim 3, wherein the contact surface comprises a surface of the first retaining mechanism facing the first endcap and configured to engage a surface of the second retaining mechanism to allow the first and second retaining mechanisms to bear a portion of a tensile axial load applied to the device.

6. The device of claim 1, wherein the restraining mechanism is independent of the bracing mechanism.

7. The device of claim 6, wherein the restraining mechanism comprises:
a second axial member extending through an aperture in one of the first or second endcaps; and
at least one stop coupled to the second axial member, wherein the aperture in one of the first or second endcaps is located between the at least one stop and the other of the first or second endcaps, and wherein a cross-sectional dimension of the stop is larger than a cross-sectional dimension of the aperture such that the stop abuts an outer surface of the endcap including the aperture to limit longitudinal translation of the endcaps away from one another.

8. A structural and/or mechanical cyclic energy dissipation device comprising:
a first end-cap;
a second end-cap;
a filament attached at a first end to the first end-cap and attached at a second end to the second end-cap, the filament comprising a material having nonlinear inelastic mechanical properties capable of both tensile elongation and compression;
a filament bracing component configured to permit longitudinal elongation and compression of the filament, while inhibiting buckling of the filament; and
a restraining component comprising at least one contact surface configured to contact another portion of the device to provide additional resistance in one axial loading direction without providing resistance in the opposite axial loading direction over a range of relative longitudinal displacement of the first end-cap relative to the second end-cap to provide an asymmetric force-displacement response to an induced cyclic axial load, the asymmetric force-displacement response including a nonlinear inelastic force-displacement response.

9. The device of claim 8, wherein the first end cap is rigidly attached to the restraining component and wherein the second end cap is movable over a limited range with respect to the restraining component.

10. The device of claim 8, wherein the filament bracing component includes at least two cantilevered members rigidly attached to the first end-cap, wherein a length of the at least two cantilevered members is less than a length of the filament but at least half the length of the filament.

11. The device of claim 8, wherein at least one of the filament and the restraining component comprises at least one of a metal, a shape memory alloy, or a composite material.

12. The device of Claim 8, wherein the filament bracing component comprises a plurality of substantially linear elastic elements attached to at least one of the end caps.

13. The device of claim 1, wherein the device is configured to dissipate energy under cyclical loading through cyclic inelastic straining.

14. The device of claim 8, wherein the restraining component is configured to engage the another portion of the device to limit longitudinal translation of the first and second endcaps toward one another when under a compressive axial load, such that other components of the device bear a portion of the compressive axial load when the restraining component is engaged with the another portion of the device, and the other components of the device do not bear a portion of a tensile axial load.

15. The device of claim 8, wherein the restraining component is configured to engage the another portion of the device to limit longitudinal translation of the first and second endcaps toward one another when under a tensile axial load, such that other components of the device bear a portion of the tensile axial load when the restraining component is engaged with the another portion of the device, and the other components of the device do not bear a portion of a compressive axial load.

* * * * *